United States Patent
Rainey et al.

(10) Patent No.: US 11,100,502 B1
(45) Date of Patent: Aug. 24, 2021

(54) MODULAR, CONFIGURABLE SMART CONTRACTS FOR BLOCKCHAIN TRANSACTION PROCESSING VALIDATIONS

(71) Applicant: KPMG LLP, New York, NY (US)

(72) Inventors: Steven K. Rainey, Vienna, VA (US); David Richard Jarczyk, Palatine, IL (US); Nikola G. Ognjanovic, Medford, NY (US); Noah Leuthaeuser, Denver, CO (US); Michal Pol, Mahwah, NJ (US); Christopher Donnelly, Hawthorne, NY (US); Jenny Li, New York, NY (US); Rafiq Mohamed Jalal, Greenwood Village, CO (US); Ashish Lal Rajbanshi, Centennial, CO (US)

(73) Assignee: KPMG LLP, New York, NY (US)

( * ) Notice: Subject to any disclaimer, the term of this patent is extended or adjusted under 35 U.S.C. 154(b) by 0 days.

(21) Appl. No.: 17/077,593

(22) Filed: Oct. 22, 2020

Related U.S. Application Data

(62) Division of application No. 16/881,157, filed on May 22, 2020.

(51) Int. Cl.
   *G06Q 20/40* (2012.01)
   *H04L 9/32* (2006.01)

(52) U.S. Cl.
   CPC ......... *G06Q 20/401* (2013.01); *H04L 9/3236* (2013.01); *H04L 9/3263* (2013.01); *G06Q 2220/12* (2013.01); *H04L 2209/38* (2013.01); *H04L 2209/56* (2013.01)

(58) Field of Classification Search
   CPC .... G06Q 20/40; G06Q 20/401; H04L 9/3236; H04L 9/3263
   USPC .......................................................... 705/51
   See application file for complete search history.

(56) References Cited

U.S. PATENT DOCUMENTS

| | | | |
|---|---|---|---|
| 10,853,353 B2 | 12/2020 | Balaraman et al. | |
| 10,915,641 B2 | 2/2021 | Smith et al. | |
| 2006/0009999 A1* | 1/2006 | Gee | G06Q 50/188 705/26.25 |
| 2015/0379510 A1* | 12/2015 | Smith | G06Q 20/3829 705/71 |
| 2016/0275059 A1* | 9/2016 | Taparia | G06F 40/169 |

(Continued)

OTHER PUBLICATIONS

Ledger—hyperledger-fabricdocs master documentation (printed Apr. 3, 2020) from https://hyperledger-fabric.readthedocs.io/en/latest/ledger/ledger.html; 11 pages.

*Primary Examiner* — Mohammad A. Nilforoush
*Assistant Examiner* — Cristina Owen Sherr
(74) *Attorney, Agent, or Firm* — Hunton Andrews Kurth LLP

(57) ABSTRACT

The invention relates to systems and methods for providing modular and configurable smart contracts for blockchain applications. The smart contracts may be utilized to retain all transaction attribute values in a world state database of the blockchain-implemented ledger. The systems and methods can further provide for dynamically configurable validation metadata and validation rules for transaction attributes recorded on a blockchain transaction log. The validation metadata and validation rules corresponding to the transaction attributes can be dynamically updated and applied to the transaction attributes to validate or invalidate a transaction.

11 Claims, 13 Drawing Sheets

(56) References Cited

U.S. PATENT DOCUMENTS

| | | | |
|---|---|---|---|
| 2017/0300872 A1* | 10/2017 | Brown | G06Q 20/3827 |
| 2018/0005186 A1* | 1/2018 | Hunn | G06F 40/103 |
| 2018/0089678 A1* | 3/2018 | Metnick | G06Q 20/12 |
| 2018/0101684 A1* | 4/2018 | Murphy | G06F 21/6245 |
| 2018/0218343 A1 | 8/2018 | Kolb | |
| 2019/0036682 A1* | 1/2019 | Qiu | H04W 12/03 |
| 2019/0250929 A1* | 8/2019 | Pasirstein | G06F 8/60 |
| 2019/0281026 A1* | 9/2019 | Mitchell | H04L 9/3239 |
| 2019/0392438 A1 | 12/2019 | Rice | |
| 2020/0005285 A1 | 1/2020 | Jimenez-Delgado | |
| 2020/0005912 A1* | 1/2020 | Saliman | H04L 63/04 |
| 2020/0019936 A1 | 1/2020 | Irazabal | |
| 2020/0028697 A1* | 1/2020 | Unger | H04L 63/101 |
| 2020/0034453 A1 | 1/2020 | Sato | |

* cited by examiner

MODULAR, CONFIGURABLE SMART CONTRACTS FOR BLOCKCHAIN TRANSACTION PROCESSING VALIDATIONS

CROSS REFERENCE TO RELATED APPLICATIONS

This Divisional Patent Application claims priority to U.S. application Ser. No. 16/881,157, filed May 22, 2020, the complete disclosure of which is incorporated herein by reference.

FIELD OF THE INVENTION

The present invention relates generally to blockchain transactions, and more specifically to systems and methods for providing modular, configurable smart contracts for blockchain transactions.

BACKGROUND

A blockchain provides a distributed ledger system comprising a plurality of nodes that can be used to store different types of information for different applications. The blockchain provides a distributed and cryptographically-verified ledger where trust is established by the distribution of identical copies of the ledger with cryptographic proof of its accuracy to each of the nodes, rather than by a trusted intermediary or central authority. Data is recorded on the blockchain as events that are referred to as "blockchain transactions," which are written into blocks on the chain. Because a blockchain is a distributed system, before adding a transaction to the blockchain ledger, all nodes need to reach a consensus status regarding the validity of the transaction. The blocks are linked together sequentially using a cryptographic hash function. The hash value of the previous block is incorporated into the header of the next block, which enables any changes to a previous block to be detected. In this way, the blockchain provides an immutable record of the transactions recorded in the blocks. Data may be written to or read from a blockchain using a smart contract. A smart contract may comprise coded algorithms stored on the blockchain that execute predefined processes.

Although the use of blockchains has increased dramatically in recent years, there are nonetheless some significant challenges inherent in known systems. One such challenge is a lack of flexibility in blockchain designs. For example, laws and regulations of particular industries may change over time. The information necessary to address a particular business or legal problem today, for example, may be incorrect with respect to future changes in the law. In some industries, the logic that applies laws and regulations to transactions needs to be updated frequently. Known blockchains are not configured to allow existing data structures to be updated with new attributes, while preserving the existing attributes and their values. Furthermore, updates to smart contracts used with blockchains currently require a developer to recode and redeploy the smart contract on all nodes of the blockchain, which is a resource-intensive process.

It would be desirable, therefore, to have systems and methods that could overcome these and other deficiencies of known blockchain systems.

SUMMARY

According to one embodiment, the invention relates to a computer-implemented method for recording a current state of a blockchain in a world state database using modular smart contracts. The method may comprise using a first modular smart contract to store a first version of a data object associated with an object key in the blockchain, wherein the data object has a first version number and includes a first set of attributes and attribute values. The method may also comprise using a second modular smart contract to: create a second version of the data object that is associated with the object key and that has a second version number; import the first set of attributes and attribute values into the second version of the data object; and import a second set of attributes and attribute values into the second version of the data object. The method may also comprise using the second modular smart contract to store the second version of the data object in the world state database; and submit the second version of the data object and the object key to the blockchain. The first modular smart contract can prevent a first party from reading and writing confidential information of a second party, and the second modular smart contract can prevent the second party from reading and writing confidential information of the first party. The first set of attributes and attribute values and the second set of attributes and attribute values each further comprises shared attributes and attribute values that are accessible to the first party and to the second party.

According to another embodiment, the invention relates to a computer-implemented method for implementing a validation rule for a transaction on a blockchain. The method may comprise storing a first smart contract on the blockchain, wherein the first smart contract is configured to execute the transaction, and storing a first data object on the blockchain relating to the transaction, wherein the first data object comprises at least one attribute value related to the transaction. The method may also include the steps of storing a second smart contract on the blockchain, wherein the second smart contract comprises a transaction validation smart contract configured to validate or invalidate the transaction; storing a second data object on the blockchain, wherein the second data object comprises validation metadata and the validation rule; and executing the second smart contract to validate or invalidate the transaction using the validation metadata and the validation rule.

The computer-implemented methods described herein may be implemented using one or more computer processors, software modules, and electronic memory or storage devices. The invention also relates to computer implemented systems and computer readable media for carrying out the methods described herein.

Exemplary embodiments of the invention can provide a number of advantages. For example, as new information is written to the blockchain, each version of a world state database following a blockchain transaction may contain all the attributes and attribute values recorded in the blockchain transaction log, thus reflecting its current status in real time or near real time. Furthermore, the system and method can obviate the need for parties to share their private/confidential attributes with each other, thus resulting in a more efficient approach that maintains privacy/confidentiality of individual attributes. In particular, with the use of the generated metadata, the blockchain is able to track, in real time or near real time, how multiple parties interact with the data. Additionally, embodiments of the invention provide a mechanism to more effectively resolve conflicts in shared attributes. Other embodiments described herein can provide advantages such as facilitating the updating of transaction validation criteria without requiring smart contract code to be retrieved and modified, and the creation of a complete audit trail by providing an immutable record on the blockchain as to when a particular rule change was implemented.

These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

DETAILED DESCRIPTION OF EMBODIMENTS

The following description of embodiments provides non-limiting examples to describe features and teachings of different aspects of the invention. The embodiments described herein are not intended to be limiting as to the scope of the invention, but rather are intended to provide examples of the components, use, and operation of the invention. The embodiments described herein should be recognized as capable of implementation separately or in combination with other embodiments of the invention.

Figure 1:
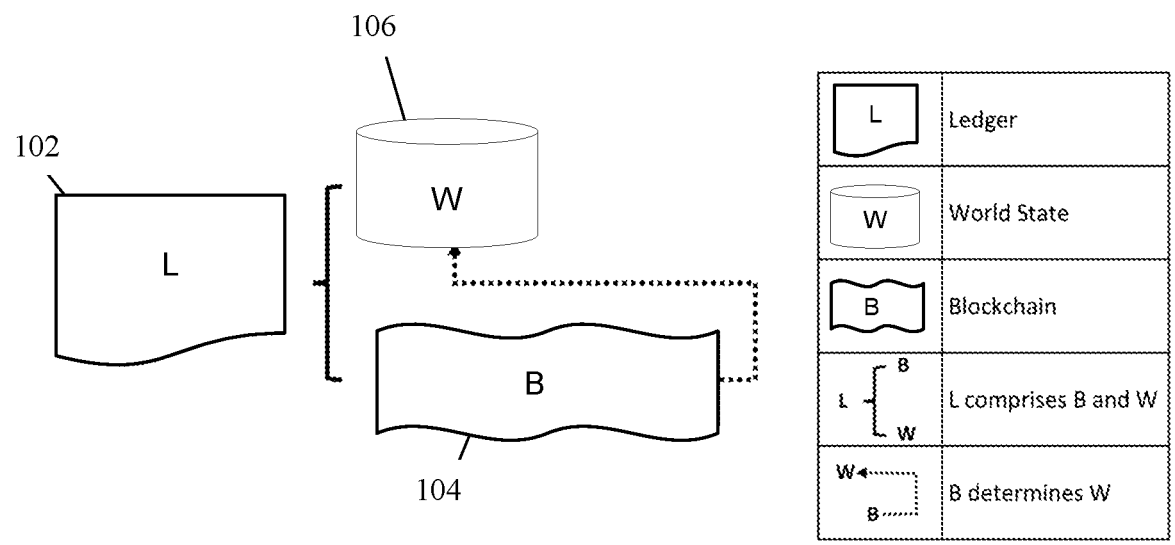
FIG. 1 is a diagram depicting elements of an existing distributed ledger system that includes a ledger comprising a blockchain and a world state database.

FIG. 1 depicts elements of an existing blockchain-based distributed ledger. In FIG. 1, the distributed ledger 102 comprises a blockchain 104 and a world state database 106. The blockchain 104 provides an immutable ledger of all blockchain transactions that have occurred, wherein every blockchain transaction is reflected as an object recorded to the blockchain in a block. An object may comprise, for example, a set of attributes and attribute values. Each block in the blockchain may reference an object key that acts as an identifier for associated transactions referencing the same object key. The world state database 106 sits on the blockchain 104 and holds all the current values for a given object key. As such, the content of world state database 106 changes over time as new transactions reference the same object key. In this way, the world state database 106 may be regarded as a snapshot of blockchain 104 that shows the current state and attribute values associated with a particular object key.

The existing distributed ledger structure shown in FIG. 1, which comprises a ledger, blockchain and world state, can be used for various applications according to exemplary embodiments of the invention which will now be described. According to one example use case, consider a commercial sale involving Party A, Party B and Party C that is recorded in one or more blockchain transactions referenced by an object key 1234. The object key 1234 is a public key that is known to the parties in this example (Party A, Party B and Party C). The object key may comprise a data set known to all the parties or a composite of the shared data known by all the parties. In the current example, the blockchain transactions store information related to a purchase and shipment of widgets from Beijing, China to Washington, D.C. In this example, the parties involved may include a customer who has purchased widgets from Beijing and needs them shipped to Washington, D.C. (Party A), a vendor in Beijing who manufactures the widgets (Party B), and the shipper in Beijing who ships the widgets from Beijing to Washington, D.C. (Party C). In this example, the object key comprises a uniquely assigned purchase order number or a combination of purchase order number and part number. The object key can be used to identify the blockchain-based transactions conducted among the three parties.

As used herein, the term "data object" may refer to an event, a series of events, a tangible or intangible asset, a service, a product, a commercial transaction such as a sale, an input, an interaction between two parties or entities, a performance, a liability, equity, calories, or other entity, object, action, or occurrence or combination thereof. Hence, in the example above, the commercial sale and shipment of widgets from Beijing to Washington, D.C. may comprise one example of a data object. Of course, exemplary embodiments of the invention may involve defining data objects to reference many other types of actions, entities, or concepts.

Referring again to the example involving a commercial sale of widgets, the data object may include one or more related attributes that are related to the data object. In this example, the attributes may comprise both party-specific and shared attributes associated with the object key 1234. The term "attribute" generally refers to a characteristic or data that describes an aspect of the data object. In the foregoing example, in the case of Party A (the customer purchasing the widgets) relevant party-specific attributes for the commercial sale (data object) may include part number (attribute A1), vendor name (attribute A2), and vendor number (attribute A3). In the case of Party B (the widget manufacturer), relevant party-specific attributes for the sale may include invoice number (attribute B1), invoice date (attribute B2) and customer number (attribute B3). In the case of Party C (shipper), relevant party-specific attributes for the sale may include bill of lading number (attribute C1), bill of lading date (attribute C2) and consignee (attribute C3). The shared data object-related attributes that are common among the parties may include quantity (attribute S1), price (attribute S2) and purchase order number (attribute S3).

Figure 2:
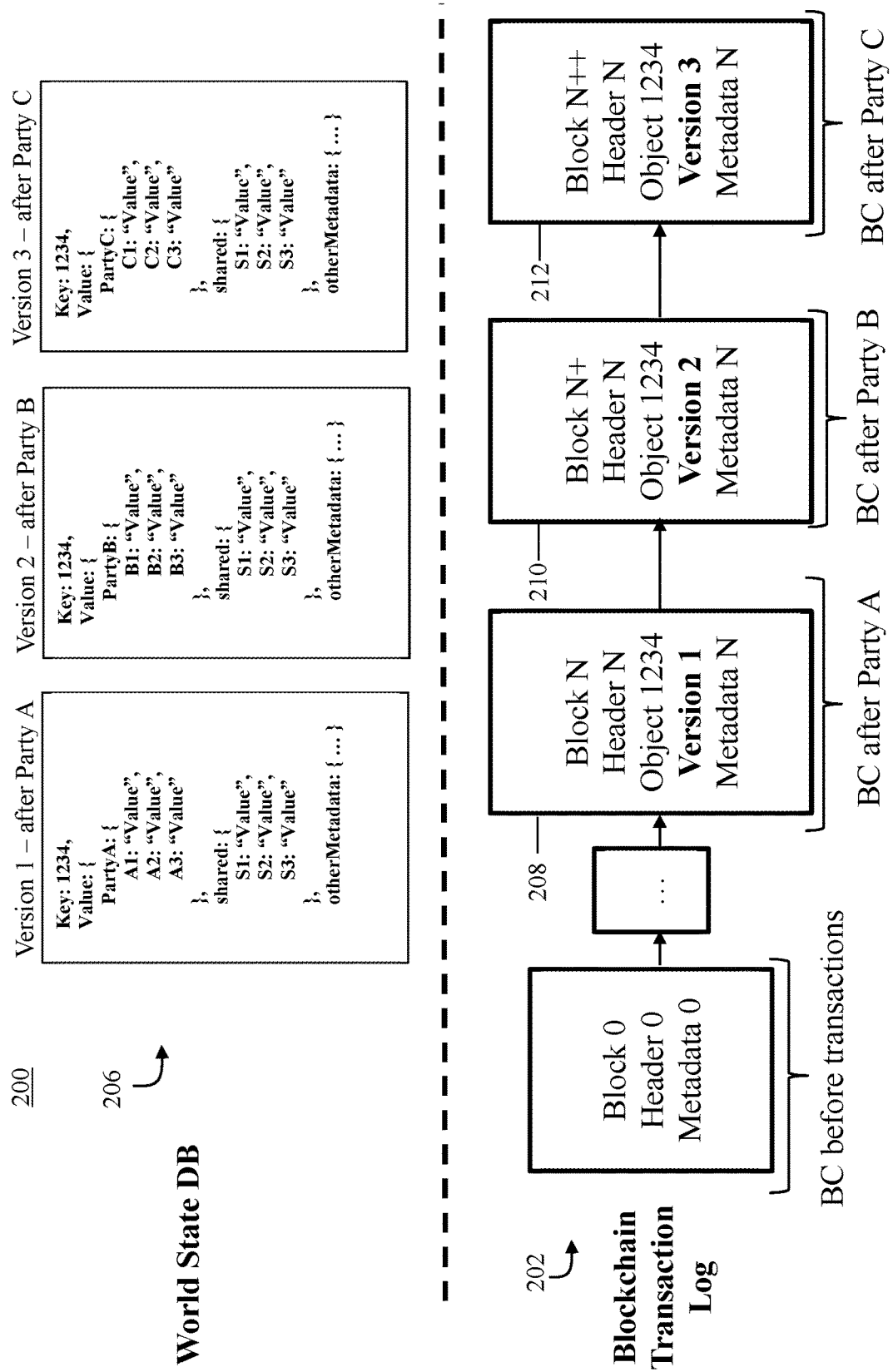
FIG. 2 is a diagram illustrating an example of a blockchain transaction log and a world state database where earlier attribute values are overwritten by later attribute values.

FIG. 2 illustrates an example of a blockchain-implemented distributed ledger 200 for the example described above according to one embodiment. The distributed ledger 200 comprises a blockchain transaction log 202 which represents an immutable ledger of all blockchain transactions with every blockchain transaction reflected as a data object in a block on the blockchain (denoted as Block 0-Block N++ in FIG. 2). Each block on the blockchain (BC) 202 contains an object key which in the present example corresponds to object key 1234. The distributed ledger 200 further comprises a world state database 206 which provides a snapshot reflecting the current state of the blockchain transaction log 202. When Party A submits its party-specific, data object-related attributes (attributes A1, A2 and A3) along with the values for the common/shared attributes (attributes S, S2 and S3) to the distributed ledger 200, a blockchain transaction is created and stored in a block 208 in the blockchain. Version 1 of the world state database 206 represents a snapshot of the blockchain transaction log 202 after data objected-related information specific to Party A (namely attributes A1-A3) and common/shared attributes (S1-S3) have been submitted.

The world state database 206 is updated every time new information is written to the blockchain 202, e.g., through execution of a smart contract. A smart contract generally comprises a coded algorithm that is stored with the blockchain and executed by the blockchain when a party interacts with the data. It contains a set of functions that provide the capabilities to post new transaction data to the blockchain, as well as read (query) data that was previously saved in the blockchain. Each function may contain coded logic to apply any data transformation or validation criteria to the data. When Party B submits its party-specific data object-related information (B1-B3) as well as the values for the common/shared attributes (S1-S3) to the blockchain 202, a corresponding blockchain transaction log entry 210 is added to a block, and version 1 of the world state database is replaced with version 2. Version 2 of the world state database 206 corresponds to a new snapshot of the blockchain 202 and comprises attribute values of Party B (B1-B3) as well as the values for the common/shared attributes (S1-S3). Similarly, when data object-related information specific to Party C is submitted to blockchain 202, a corresponding blockchain transaction is created and stored in a block and a new version (version 3) of the world state database 206 replaces the previous version (version 2). In the example shown in FIG. 2, attributes are overwritten in the world state database after successive transactions. For example, in version 2 of the world state database, the Party B attributes B1-B3 overwrite the Party A attributes (A1-A3), and in version 3 the Party C attributes (C1-C3) overwrite the Party B attributes (B1-B3).

According to a preferred embodiment of the invention, a distributed ledger is provided that includes modularly designed smart contracts that permit the addition of new attributes without overwriting the old attributes. The modular design of the smart contracts preserves, in a current version of the world state database, all data object-related attribute values provided to the blockchain, thus reflecting the current status of the data object, including all attributes and attribute values, in real time or near real time. Because the smart contracts are modular in design, they enable the compilation of all party-specific attributes into the world state database without requiring any party to share its party-specific attributes with another party. Accordingly, modular smart contracts, as provided by preferred embodiments of the invention, preserve the privacy of attributes, only allowing the assigned party to access their own attributes as well as shared attributes, but not the attributes of other parties. Transacting parties involved only submit their own attributes, and the smart contract logic determines what needs to be preserved in each new version of world state database. The modular smart contract logic preserves privacy requirements by controlling the information that may be submitted and/or viewed by each party involved in the transaction while preserving, in the current world state, all data object-related attribute values provided to the blockchain transaction log.

Figure 3:
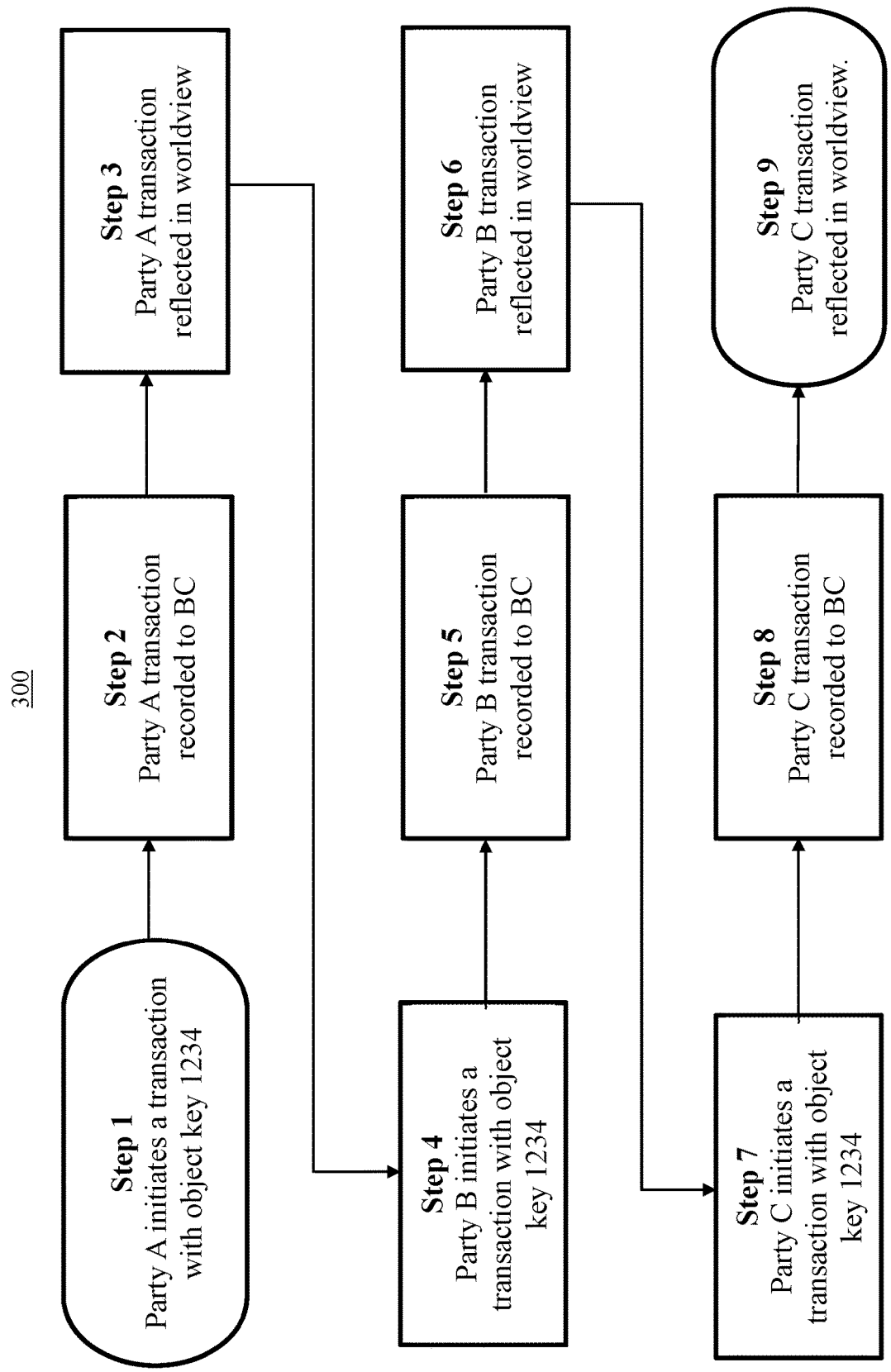
FIG. 3 is a flowchart illustrating an operation of a blockchain ledger using modular smart contracts according to an embodiment of the invention.

An example of the operation of a modular smart contract for the above example involving Parties A, B and C is shown in FIG. 3. Referring to the flowchart 300 in FIG. 3, at Step 1 Party A initiates a transaction with object key 1234. The Party A transaction is then recorded to blockchain (BC) at Step 2. A snapshot of the blockchain transaction log, reflecting the Party A transaction, is then recorded in the world state database at Step 3. Party B then initiates a transaction with object key 1234 at Step 4. Subsequently, at Steps 5 and 6, the Party B transaction is recorded in the blockchain and reflected in the new world state (new version of world state database) along with the transaction information from Party A. Similarly, when Party C initiates a transaction with object key 1234 at Step 7, the transaction information is recorded to the blockchain at Step 8 and reflected, along with transaction information from Party A and B, in the new world state (new version of world state data base) at step 9.

Figure 4:
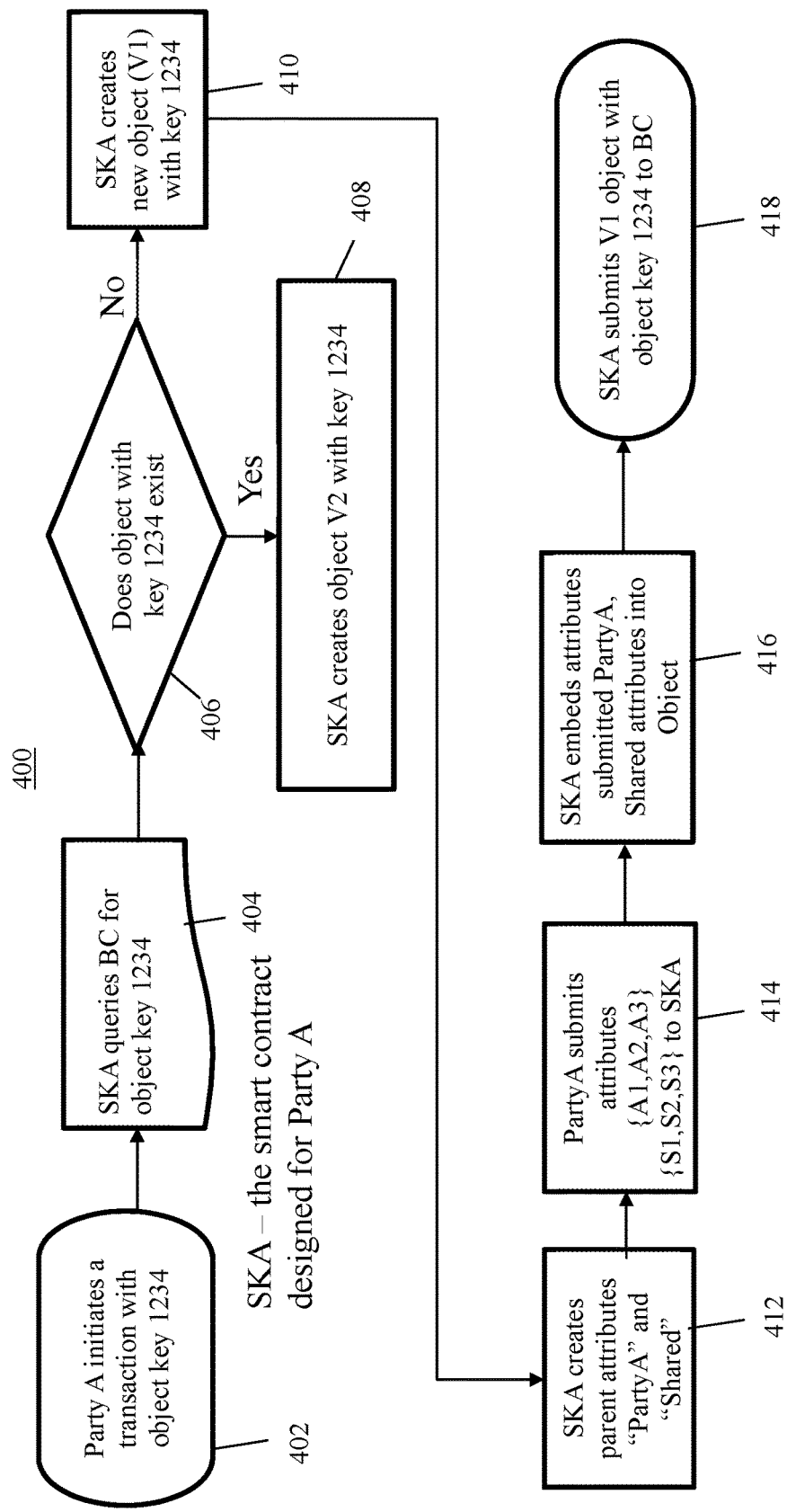
FIG. 4 is a flowchart illustrating an operation of a blockchain ledger using modular smart contracts according to an embodiment of the invention.

FIG. 4 illustrates an example of a process involving the interaction of Party A with the modular smart contract for submitting transaction information to the blockchain according to one embodiment of the invention. With reference to FIG. 4, the process starts at Step 402 when Party A initiates a transaction, to place a purchase order, with object key 1234. At Step 404, a modular smart contract designed for Party A (SKA) receives the transaction and object key 1234 and queries the blockchain for the object key 1234. At Step 406 the smart contract for Party A (SKA) determines whether a data object with object key 1234 exists in the blockchain. At Step 408, if a data object with object key 1234 already exists in the blockchain, the SKA pulls the corresponding attribute values for the data object from the current version of the world state database (Version 1) and creates a new version (Version 2) of the data object with object key 1234 that includes the Version 1 attributes. If no data object with object key 1234 is found in the blockchain in Step 406, the SKA creates a new data object (Version 1) with object key 1234 in Step 410.

At Step 412, the SKA creates a parent attribute, "Party A," for storing values of private attributes provided by Party A, and a parent attribute, "Shared," for storing shared attribute values provided by Party A. At Step 414, Party A submits its private attributes (A1, A2, A3) and the shared attributes (S1, S2, S3) to the SKA. At Step 416, the SKA embeds the party-specific attributes submitted by Party A and the shared attributes into the data object. In Step 418, the SKA submits the data object (Version 1) with object key 1234 to the blockchain.

Although the data object in the above example includes parent attributes, this is just one example of how to configure the data object. The modular design described herein does not require parent attributes. Those skilled in the art will appreciate that various configurations of the data object can be used with different embodiments of the invention. For example, the data object can be designed to have a flat structure with all attributes at the top level, or it could include a deep hierarchy with as many levels as desired.

Figure 5:
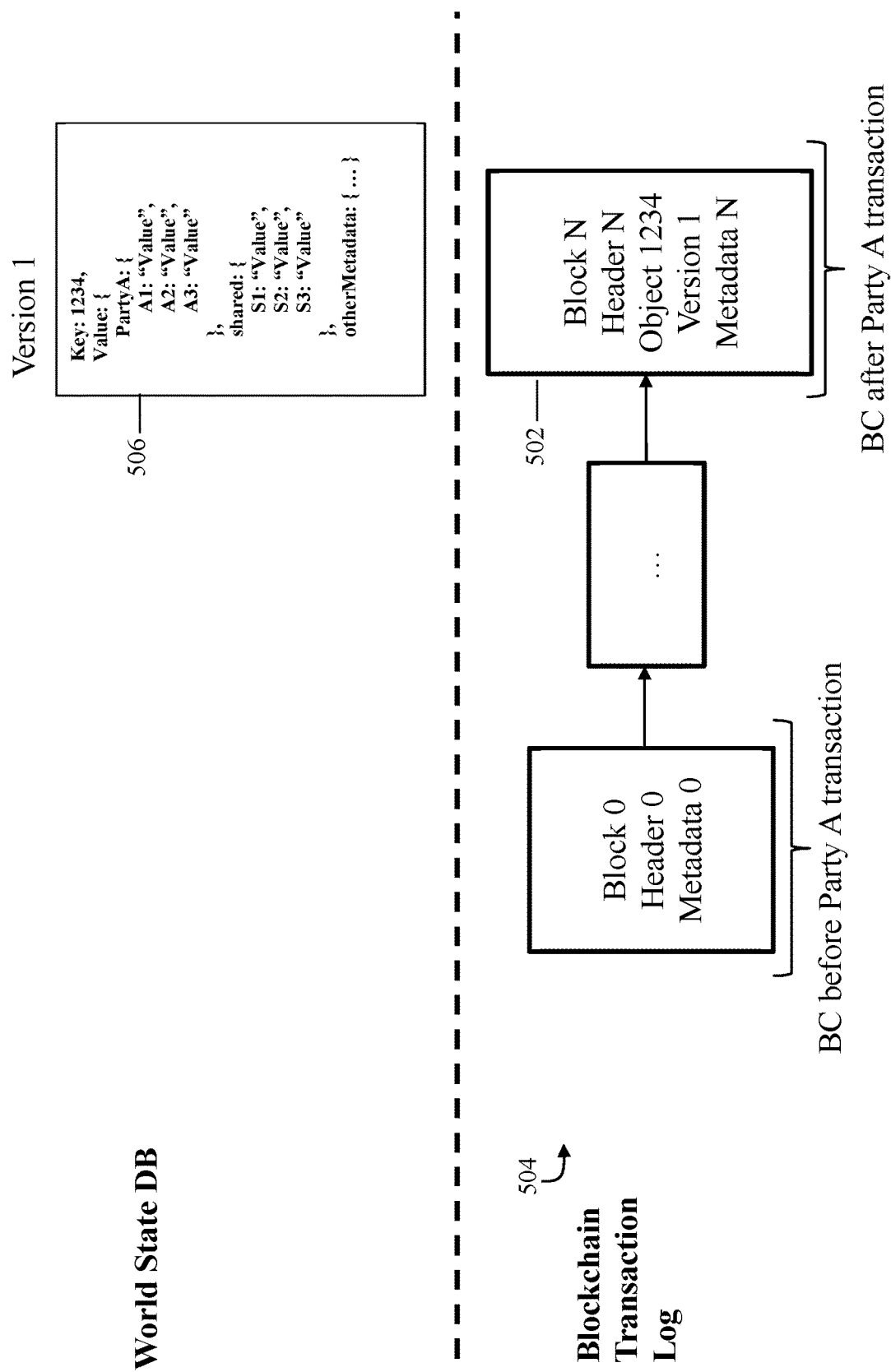
FIG. 5 is a diagram illustrating a world state database view of a blockchain ledger according to an embodiment of the invention.

FIG. 5 illustrates the state of the distributed ledger after the Party A transaction information is submitted and recorded to the distributed ledger by the modular smart contract SKA, according to an exemplary embodiment of the invention. The Party A transactional information is reflected in a data object referenced as Version 1 (V1) in a block 502 of the blockchain 504. Block 502 also contains the object key 1234. In addition to the blockchain transaction log 504, the distributed ledger also comprises a world state database 506 that holds the current attributes and attribute values associated with object key 1234 and provided by the SKA. Accordingly, following the Party A transaction, the world state database contains the transactional attributes for Party A (A1, A2, A3) and corresponding attribute values as well as the shared attributes (S1, S2, S3) and corresponding attribute values. In some embodiments the world state database may further include additional metadata, such as a version number of the data object, a timestamp that indicates when the current version was created or updated, an identity of the party and/or user who submitted the current version, etc.

Figure 6:
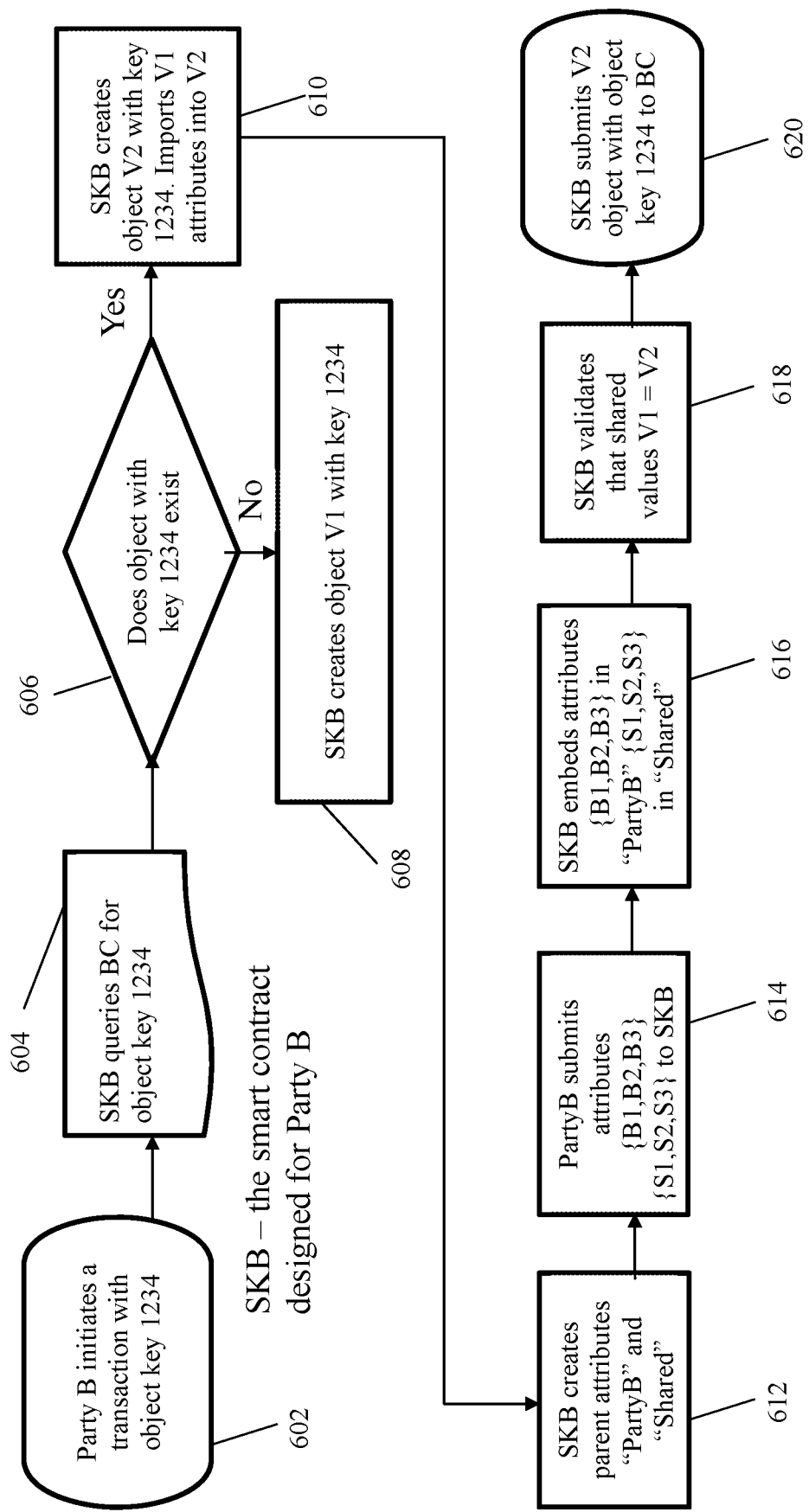
FIG. 6 is a flowchart illustrating an operation of a blockchain ledger using modular smart contracts according to an embodiment of the invention.

An example of the process involving the subsequent interaction of Party B with a modular smart contract for submitting transaction information to the blockchain-implemented ledger is illustrated in FIG. 6. With reference to FIG. 6, the procedure begins at Step 602 when Party B initiates a transaction, to fulfill the purchase order placed by Party A according to this example. The transaction is assigned the same object key 1234. At Step 604, a modular smart contract designed for Party B (SKB) receives the transaction with object key 1234 and queries the associated blockchain transaction log to determine if the object key 1234 exists. At Step 606 the SKB determines whether a data object with object key 1234 exists in the blockchain. If no data object with object key 1234 is found in the blockchain, the SKB creates a new data object (Version 1) with object key 1234 in Step 608.

However, if a data object (Version 1) with an object key 1234 already exists in a block of the blockchain, then the SKB creates Version 2 of the data object. In Step 610, the SKB pulls the corresponding attribute values for the data object from the current version of the world state database (Version 1) and creates a second version of the data object (Version 2) with object key 1234 which includes the Version 1 attributes. At Step 612, the SKB creates a parent attribute, "Party B," for storing the private attributes (B1, B2, B3) and attribute values provided by Party B, and a parent attribute, "Shared," for storing shared attribute values provided by Party B. At Step 614, Party B submits its private attributes (B1, B2, B3) and the shared attributes (S1, S2, S3) to the SKB. At Step 616, the SKB embeds attributes B1, B2 and B3 into parent attribute "Party B" and embeds the shared attributes S5, S2 and S3 into parent attribute "Shared." At Step 618, the automated logic of SKB verifies that the shared attribute values (S1-S3) in data object Version 2 provided by Party B match the shared attribute values in data object Version 1 provided by Party A. If the shared attributes values match, the SKB submits object Version 2 with object key 1234 to the blockchain in Step 620.

According to one embodiment, pulling attribute values from a previous version of a data object that are associated with the same object key, and validation of data, occurs automatically through the automated logic of the modular smart contract. The automated logic of the modular smart contract, according to some embodiments, determines which attributes are new, which attributes are shared, and which attributes need to be retained in subsequent versions of the world state database.

Figure 7:
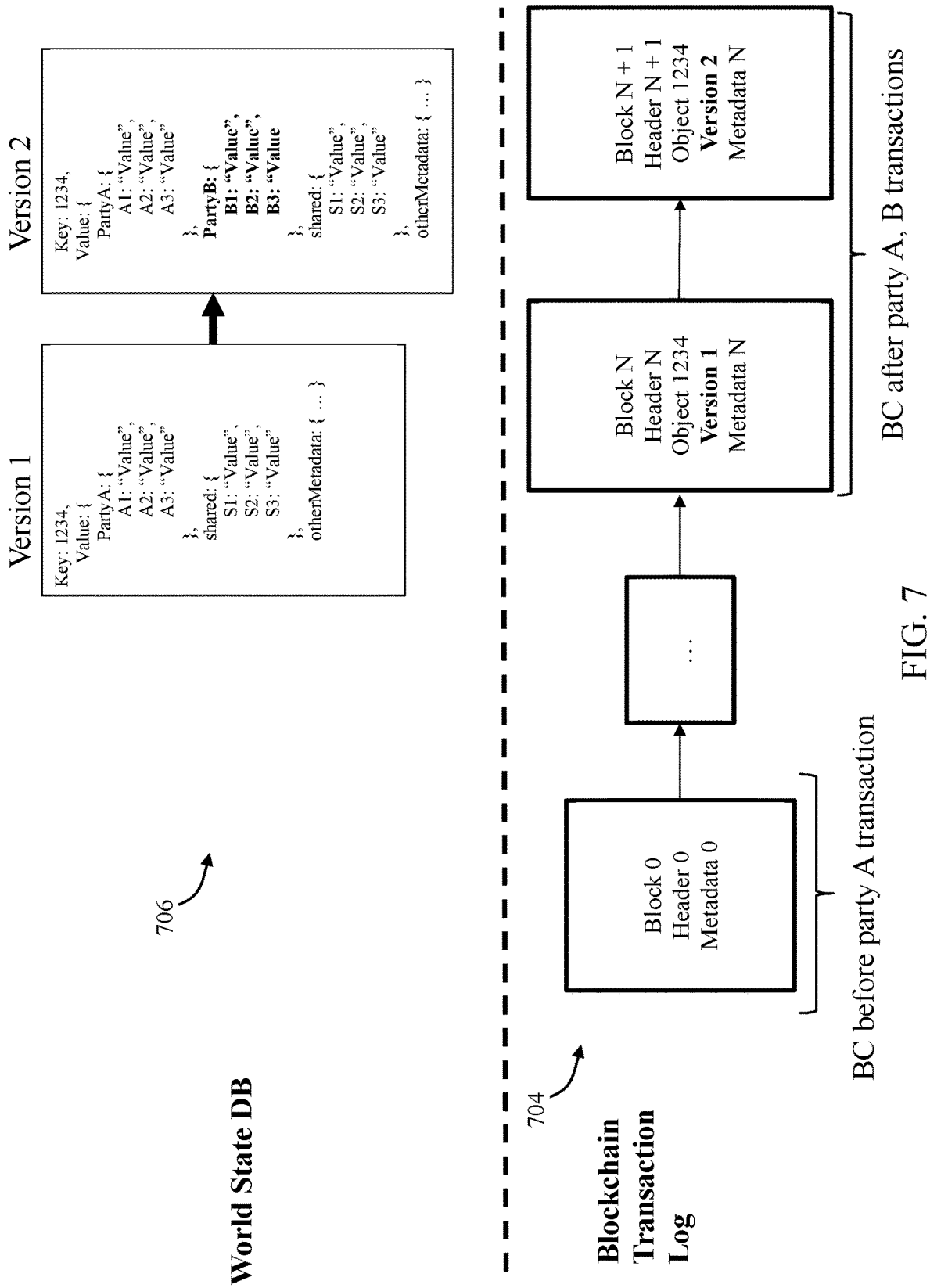
FIG. 7 is a diagram illustrating a world state database view of a blockchain ledger according to an embodiment of the invention.

The state of the distributed ledger after the Party B transaction information is submitted and recorded to the distributed ledger by the modular smart contract is depicted in FIG. 7, according to an exemplary embodiment of the invention. FIG. 7 illustrates the state of the distributed ledger after the Party A and Party B transactions are completed and the corresponding transactional information has been recorded to the distributed ledger through the modular smart contracts SKA and SKB, according to one embodiment of the invention. The Party A and Party B transactional information is reflected as data objects referenced as Version 1 (V1) and Version 2 (V2) in discrete blocks N and N+1 of the blockchain 704. Both blocks N and N+1 of the blockchain contain the object key 1234. Although the example in FIG. 7 shows Version 1 and Version 2 in discrete blocks N and N+1, respectively, in other embodiments, multiple blockchain transactions can be stored in a single block of the blockchain.

In addition to the blockchain 704, the distributed ledger in FIG. 7 also comprises a world state database 706 that holds the current attributes and attribute values associated with object key 1234 as provided by SKA and SKB. Accordingly, Version 1 of the world state database, created following the Party A transaction, contains the data object-related attributes (A1, A2, A3) for Party A and corresponding attribute values, as well as the shared attributes (S1, S2, S3) and corresponding attributes values. Version 2 of the world state database, created following the Party B transaction, contains the data object-related attributes (B1, B2, B3) for Party B and the corresponding attribute values as well as the shared attributes (S1, S2, S3) while also retaining the data object-related attributes and attribute values of Party A. The modular smart contract SKB captures the data object-related information (e.g., attributes and attribute values) from Party B while preserving Party A attributes and attribute values in Version 2 of the world state database. According to one example, the world state database only holds the latest version at any given time. In this example, the world state database only holds Version 2 (because it's the latest), while the blockchain transaction log retains all the versions (1 and 2). According to an embodiment, shared attributes propagate across developing versions of the world state database. In some embodiments, the world state database may further include additional metadata, as described above.

Figure 8:
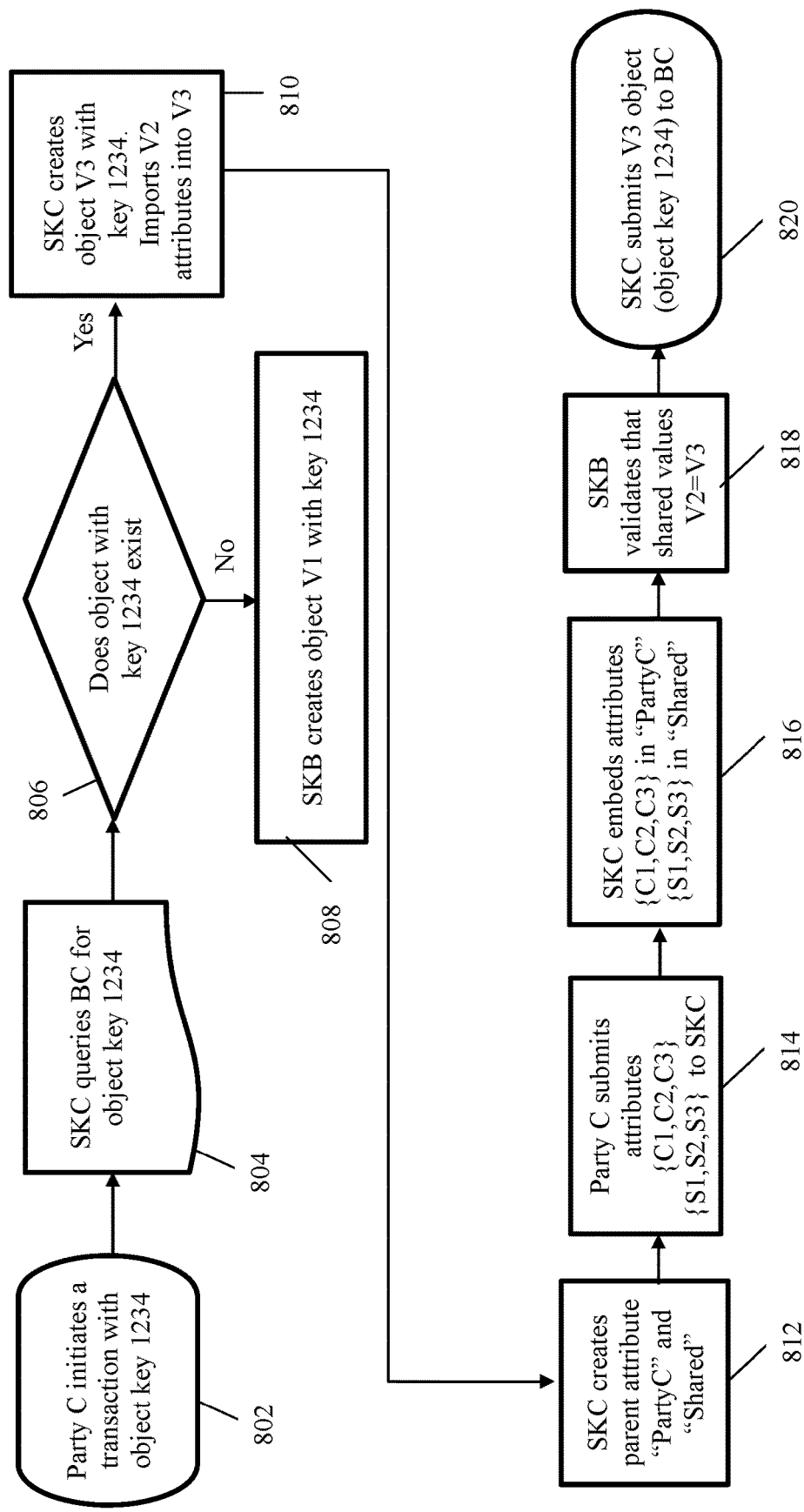
FIG. 8 is a flowchart illustrating an operation of a blockchain ledger using modular smart contracts according to an embodiment of the invention.

An example of a detailed process involving subsequent interaction of Party C with a modular smart contract for submitting data object-related information to the blockchain transaction ledger is illustrated in FIG. 8. With reference to FIG. 8, the procedure begins at Step 802 when Party C initiates a transaction, to fulfill a shipping order from Party B in Beijing to Party A in Washington, D.C. The transaction is assigned the same object key as transactions from Parties A and B, namely object key 1234. At Step 804, a modular smart contract designed for Party C (SKC) receives the transaction with object key 1234 and queries the associated blockchain transaction log with the object key 1234. At Step 806, the SKC determines whether a data object with object key 1234 exists in the blockchain transaction log. If no data object with object key 1234 is found in the blockchain transaction logs, SKC creates a new data object (V1) with object key 1234 in Step 808.

However, if a data object with object key 1234 exists in the blockchain, then the SKC creates a Version 3 of the data object associated with object key 1234 and imports the Version 2 attributes into Version 3. These attributes in Version 2 from Party A and Party B already exist in one or more blocks of the blockchain. Furthermore, the current version of world state database (Version 2), generated following the transaction from Party B, contains transactional information from Party A and B (i.e., A1-A3, B1-B3 and S1-S3). At Step 810 the SKC pulls the corresponding attribute values for the data object from the current version of the world state database (Version 2) and creates a third version of the data object (V3) with object key 1234 into which the V2 attributes are imported.

At Step 812, the SKC creates a parent attribute, "Party C," for storing the private attributes (C1, C2, C3) for Party C and corresponding attribute values, and a parent attribute, "Shared," for storing shared attribute values provided by Party C. At Step 814, Party C submits its private attributes (C1, C2, C3) and the shared attributes (S1, S2, S3) to the SKC. At Step 816, the SKC embeds the Party C attributes C1, C2 and C3 into parent attribute, "Party C," and the shard attributes S1, S2 and S3 into parent attribute, "Shared."

At Step 818, the automated logic of the SKC validates the data by verifying that the shared attribute values (S1-S3) in object V3 (provided by Party C) match the shared attribute values in data object V2 (provided by Party B that were previously validated against shared attribute values in V1 provided by Party A). If the shared attributes match, the SKC submits the data object V3 with object key 1234 to the blockchain transaction log in Step 820.

Figure 9:
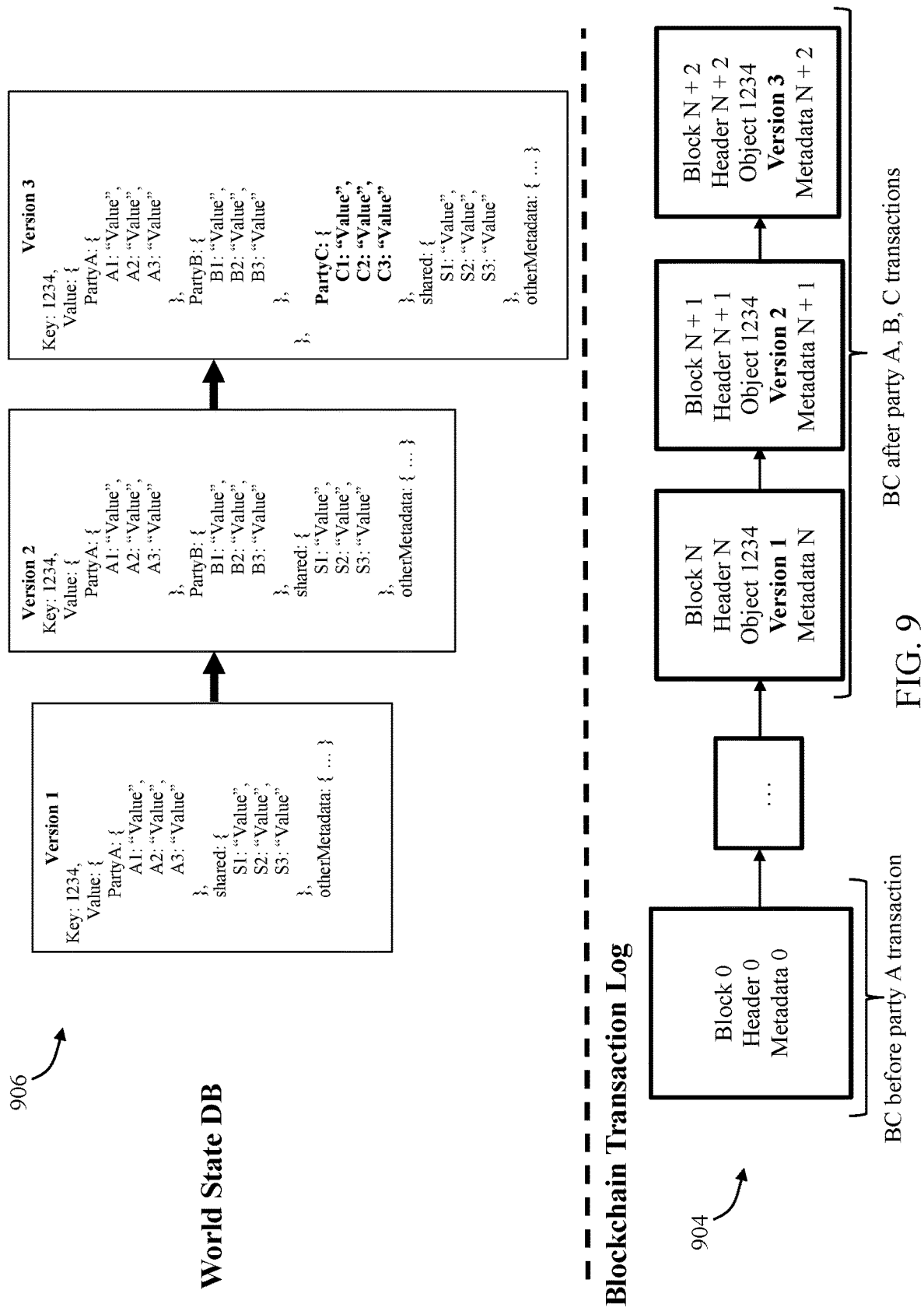
FIG. 9 is a diagram illustrating a world state database view of a blockchain ledger according to an embodiment of the invention.

The state of the distributed ledger after the transaction information of Party C is submitted and recorded to the distributed ledger by the modular smart contract, in accordance with an embodiment, is depicted in FIG. 9. FIG. 9 illustrates the state of the distributed ledger after the Party A, B and C transactions are completed and the corresponding data object-related information has been recorded to the distributed ledger through the modular smart contracts. Transactional information from Parties A, B and C is reflected as data objects referenced as Version 1 (V1), Version 2 (V2) and Version 3 (V3) in respective blocks N, N+1 and N+2 of the blockchain 904. The respective blocks N, N+1 and N+2 of blockchain 904 contain the same object key 1234. In addition to the blockchain 904, the distributed ledger in FIG. 9 also comprises a world state database 906 that holds the current attributes and attribute values associated with object key 1234 as provided by SKA, SKB and SKC. Accordingly, Version 1 of the world state database, created following the Party A transaction, contains the data object-related information for Party A (attributes A1, A2, A3 and the corresponding attribute values) as well as the shared attributes/values (S, S2, S3). Version 2 of the world state database, created following the Party B transaction, contains the data object-related information for Party B (attributes B1, B2, B3 and the corresponding attribute values) as well as the shared attributes/values (S1, S2, S3) while also retaining the data object-related attributes and attribute values of Party A. Version 3 of the world state database, created following the Party C transaction, contains the data object-related information for Party C (attributes C1, C2, C3 and the corresponding attribute values) as well as the shared attributes/values (S1, S2, S3) while also retaining the data object-related attributes and attribute values of Party A and Party B. The modular smart contracts capture the data object-related information (attributes and attribute values) from Party C while preserving Party A and Party B attributes and attribute values in Version 3 of the world state database. According to one embodiment, the world state database only holds the latest version at any given time. In this example, the world state database only holds Version 3 (because it's the latest), while the blockchain transaction log retains all the versions (1, 2 and 3).

In some embodiments, previously recorded transactional information, such as data object-related attributes and values, may be pulled from the previous version of the world state database to be included, along with any newly captured data object-related information, in the current version of the world state database. According to an embodiment, shared attributes may propagate across developing versions of the world state database. In some embodiments the world state database may further include additional metadata, as described above.

It should be noted that although the descriptions provided above are based on the example of a three-party commercial sale and shipment, various other embodiments of the invention are applicable to any blockchain-implemented application and different types of data objects. As such, attributes and attribute values may comprise any information (financial or non-financial) that is to be tracked and/or correlated with other data. In addition, although some of the examples describe blockchain transactions recorded in discrete blocks of the blockchain, exemplary embodiments of the invention typically include arrangements where multiple blockchain transactions are stored in a single block or multiple blocks.

Figure 10:
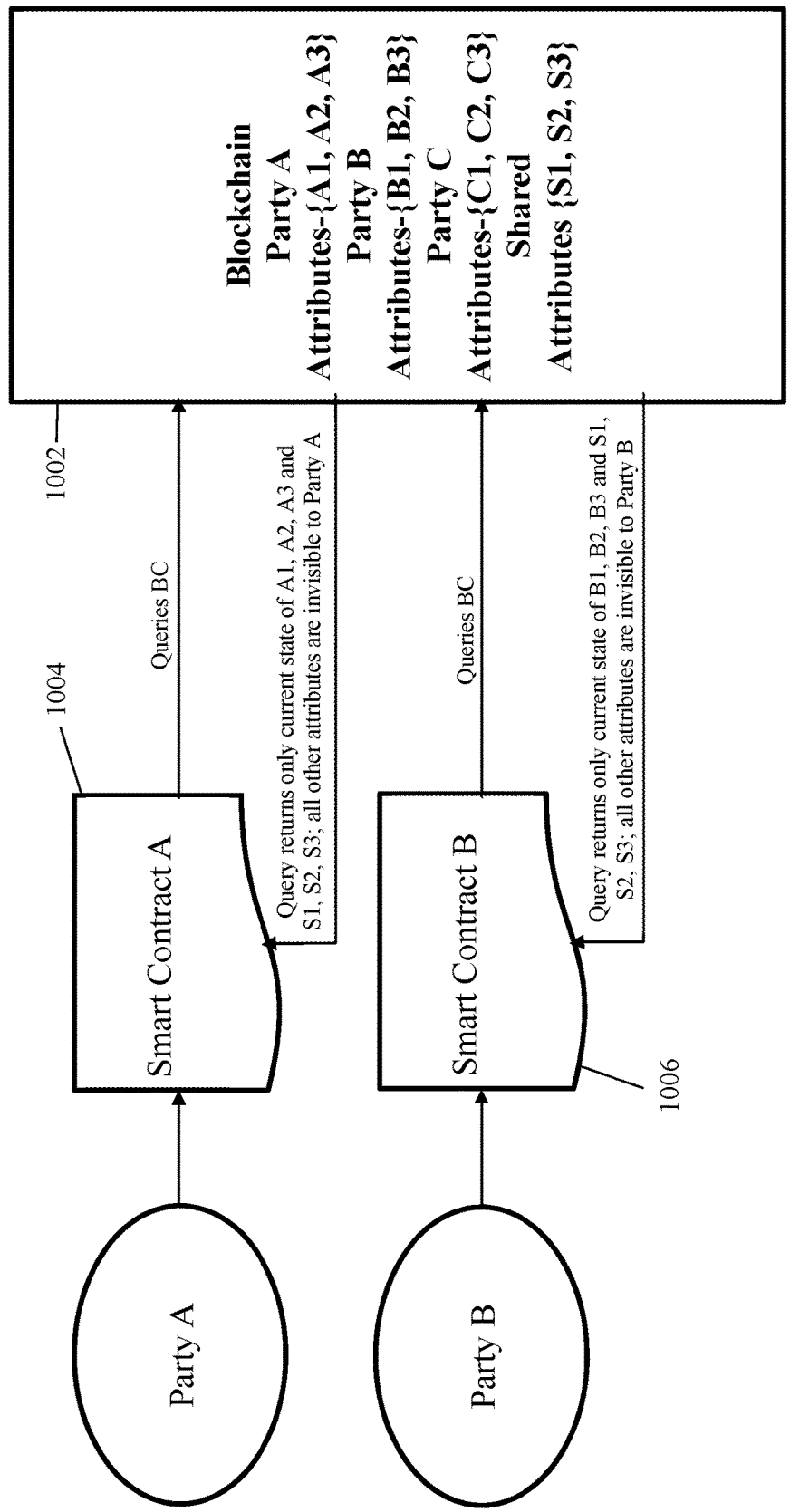
FIG. 10 is a diagram illustrating an interaction of transacting parties with a blockchain using modular smart contract according to an embodiment of the invention.

In accordance with various embodiments of the invention, the automated logic of the modular smart contracts is designed to control the data-object related information written to and/or read from a blockchain-implemented distributed ledger. For example, the automated logic can determine which attributes are new, which attributes are party-specific and private, which attributes are shared, and which attributes to retain from one version of the world state database to next. The automated logic can also determine the types of data that different transacting parties are entitled to read, write, and otherwise access. FIG. 10 illustrates an example of modular smart contracts that control access to data object-related information recorded on a blockchain, such that each transacting party is allowed only to query its own attributes and shared attributes. With reference to FIG. 10, Party A and Party B interact with blockchain 1002 through smart contract A (SKA) 1004 and smart contract B (SKB) 1006, respectively. For example, when SKA queries the blockchain-implemented ledger on behalf of Party A, the query returns only the current state of A1, A2, A3 and S, S2, S3; the other attributes are invisible to Party A. Similarly when SKB queries the blockchain-implemented ledger on behalf of Party B, the query returns only the current state of B1, B2, B3 and S, S2, S3; the other attributes are invisible to Party B As described above, embodiments of the invention are directed to modular smart contracts for blockchain applications designed to retain data object-related attribute values across evolving versions of the world state database such that each version contains all of the attributes, reflecting a current status of a blockchain-implemented ledger in real time or near real time. As such, some embodiments of the invention are directed to a more efficient approach for conducting blockchain-based transactions that maintains privacy of individual attributes and furthermore provides mechanisms to resolve conflicts in accordance with configurable options such as, for example, consistency of shared attribute values.

Figure 11:
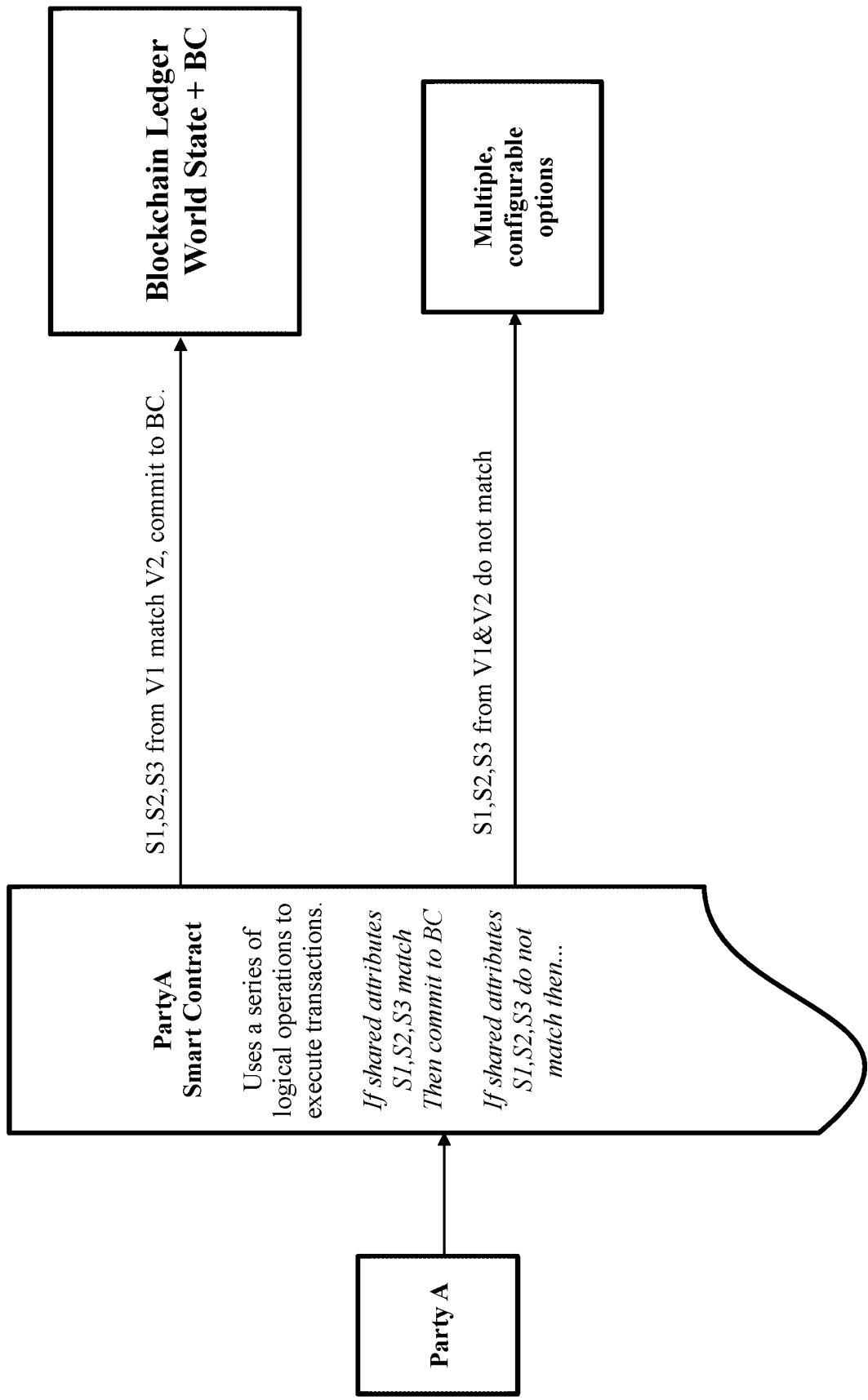
FIG. 11 is a diagram illustrating aspects of modular smart contract functionality according to an embodiment of the invention.

According to another aspect of the invention, the distributed ledger may include a smart contract that is programmed to provide conflict resolution among transacting parties by adjudicating conflicts with respect to shared attributes. FIG. 11 illustrates an exemplary embodiment involving a modular smart contract for Party A (SKA) that analyzes the information submitted by Party A to determine whether or not the respective information can be written to the blockchain transaction log. According to one embodiment, the SKA executes transactions submitted by Party A if the shared attributes (S1, S2, S3) match the shared attributes stored previously (for example, in the current or prior versions of world state database). If the shared attributes do not match, the modular smart contract may resolve the conflict based on number of configured responses.

The exemplary modular smart contract referenced in FIG. 11 as Party A smart contract may use a series of logical operations (e.g., a set of if/then statements or other algorithms of varying complexity) to determine whether the shared attribute values submitted by Party A as part of its data-object related information to be recorded on the blockchain are valid based on a comparison to shared attribute values recorded, for example, in the current versions of the world state database. For example, if the submitted values for shared attributes S1, S2, and S3 match the current values recorded in the blockchain-implemented ledger, then the data object-related information from Party A (e.g., data object attributes and attribute values submitted by Party A) is committed to the blockchain and reflected in a new version of the world state database.

However, if the submitted values for shared attributes S1, S2, and S3 do not match the current values recorded in the blockchain-implemented ledger, the smart contract may be configured with multiple options for responding to the conflict. The smart contract validation criteria may be based on reconciliation of overlapping attributes. For example, the automated logic of the smart contract may validate new values against the existing values in cases where the same data attribute is submitted multiple times by one or more parties (e.g., shared attribute and attribute values).

According to another embodiment, the validation criteria for information submitted to a blockchain may be based on functional roles and/or authority associated with different transacting parties such that different parties may be given priority in determining valid values for certain attributes. In one example, Party A (customer) saves the value for the "quantity" attribute as 10 units, and Party B (vendor) submits their dataset to update the data object, but Party B's value of the "quantity" attribute shows 15 units. The automated logic of the smart contract can be configured to dictate the value for the "quantity" attribute by the quantity specified in the Purchase Order by Party A, so Party B's updated transaction data may be rejected until the correct quantity is resolved. However, Party A may be permitted to update the value if they update the Purchase Order. In another example, Party C (broker) has saved the value for the "Harbor Maintenance Fee" attribute with an estimate of $15.00. Party D (US Customs) adds attributes to the existing data object, along with an update for the "Harbor Maintenance Fee" attribute of $15.67. The smart contract may allow Party D to overwrite the value for this attribute because they dictate the exact amount. An alert may be sent to Party C to notify them of the update.

According to other embodiments of the invention, one or more smart contracts may be configured to respond in customized and predefined ways in order to reconcile conflicts in the submitted attributes and attribute values. For example, a smart contract may be customized to always reject or always approve overwrites. Alternatively, the response may be customized based on an established hierarchy of transaction parties (e.g., the smart contract may verify the identity of the party that last updated the value and may allow overwrite if the overwriting party is above or the same level as the first party in the hierarchy, otherwise the overwrite is rejected). In another example, the smart contract may be customized to respond to conflicts by allowing overwrites based on one or more conditions (e.g., if Attribute 1 has a certain value, allow overwrites of Attribute 2). Yet another example may involve a smart contract that is customized to allow overwrites based on a previous value (e.g., allow an overwrite if the new value is within $1 of the old value, otherwise raise flag).

According to another embodiment of the invention, one or more transaction-validation smart contracts can be provided to enable the modification of existing processing criteria and/or the addition of new processing criteria without the need to recode and redistribute the smart contracts to every node or party involved in the blockchain transaction. To illustrate this embodiment, some of the exemplary operational and functional features of a modular, transaction-validation smart contract are described in context of example scenarios provided below.

According to one example, attribute data submitted in the context of a blockchain transaction must remain in compliance with one or more validation rules such as one or more business or tax rules. The validation criteria used by the automated logic of the smart contract may be customized in accordance with validation rules, such as business, tax or other rules or criteria provided by a user or administrator of the system. For example, consider a scenario in which the criteria for filing a duty drawback claim (a refund on duties, taxes, and fees paid on imported goods that are later exported as unused or as finished product or merchandise destroyed under Customs supervision) is an import date of less than or equal to 5 years. Under the current tax laws, an importer of goods may claim a tax deduction for qualifying shipments of widgets made in the past 5 years. A smart contract can be designed to check the import date and submit the tax write-off to the blockchain if the import date is within 5 years or less. If the import date is greater than 5 years, then the smart contract will reject the transaction.

According to an exemplary embodiment of the invention, if the law applicable to the transaction is changed, necessitating new transaction processing criteria (e.g., the allowable period of five years is changed to seven years), the transaction-validation smart contract may be used to dynamically update the validation criteria instead of having to recode and redistribute the smart contract to all nodes of the blockchain. The new rule or validation criteria can be configured to apply to transactions on or after a specified date, for example. The new rule or validation criteria can also be configured to apply retroactively, or to any specific time period, for example.

The enhanced functionality can be achieved by dynamically storing validation metadata in the blockchain and in the world state database, according to a preferred embodiment. Rather than referencing hard coded processing rules, modular, transaction-validation smart contracts, as provided by embodiments of the invention, will utilize the stored validation metadata for the relevant rules and information on the data-object related attributes. The validation metadata may comprise attribute values, data types, and business rules, for example. The smart contracts may be designed to reject an attribute value if it does not meet a given criteria or data type. The smart contracts may also be designed with customizable validation rules (e.g., one or more business rules), such that if a value does not satisfy the validation rule, the transaction is rejected.

In this specific example, the validation criteria utilized by automated logic of the smart contract may be customized to validate the "import date" attribute against the current date minus a specified number of years. If the value for the attribute is older than the specified number of years, the transaction may be rejected and the submitting party notified. Initially, for the example above, the number of years is 5. The functionality of the smart contract can be updated by updating the validation metadata from five years to seven years to account for the change in the law.

The embodiments described above can provide a number of advantages. For example, they can eliminate the need for a software developer to obtain current smart contract code, hard code a new smart contract with new criteria (e.g., less than or equal to 7 years from import date), package the smart contract with a new version number, and distribute it to every node on the blockchain and every transacting party. The same advantages would apply to other validation rule updates. In addition changes are easier to understand than retrieving and analyzing the actual computer code for a particular version of the smart contract.

Furthermore, embodiments of the invention can enable the creation of a complete audit trail by providing an immutable record on the blockchain as to when the change was implemented (e.g., changing 5 years to 7 years). Since the validation metadata and rules are now stored in data objects in the blockchain, any updates to these data objects will be saved as a new version, but the transaction log will still retain the old version since it's immutable (similar to the example of a data object for modular design described above in connection with the sale of widgets). Each blockchain transaction is timestamped, so a user can query the history of a data object from the transaction log to determine what exactly changed between the versions and when.

According to one example, Version 1 of a rule requires the import date to be within the past 5 years of today. On Jan. 1, 2020 a user makes a request to submit a new transaction with an import date of Jan. 1, 2014. The transaction will fail the rule, but the smart contract can be designed to not reject this transaction completely, but rather keep it with a flag that says "Ineligible." Then, suppose that on Feb. 1, 2020 the rule changes to 7 years and is updated in Version 2 of the rule. Technically, the "Ineligible" transaction with an import date of Jan. 1, 2014 now becomes eligible and with the audit trail for the rules, a user can easily see that at the time this transaction was originally processed, the 5 year rule was in effect, which allows the user to mitigate the situation. As will be appreciated by those skilled in the art, the audit trail functionality can be applied to any data objects, such as those identified above.

Figure 12:
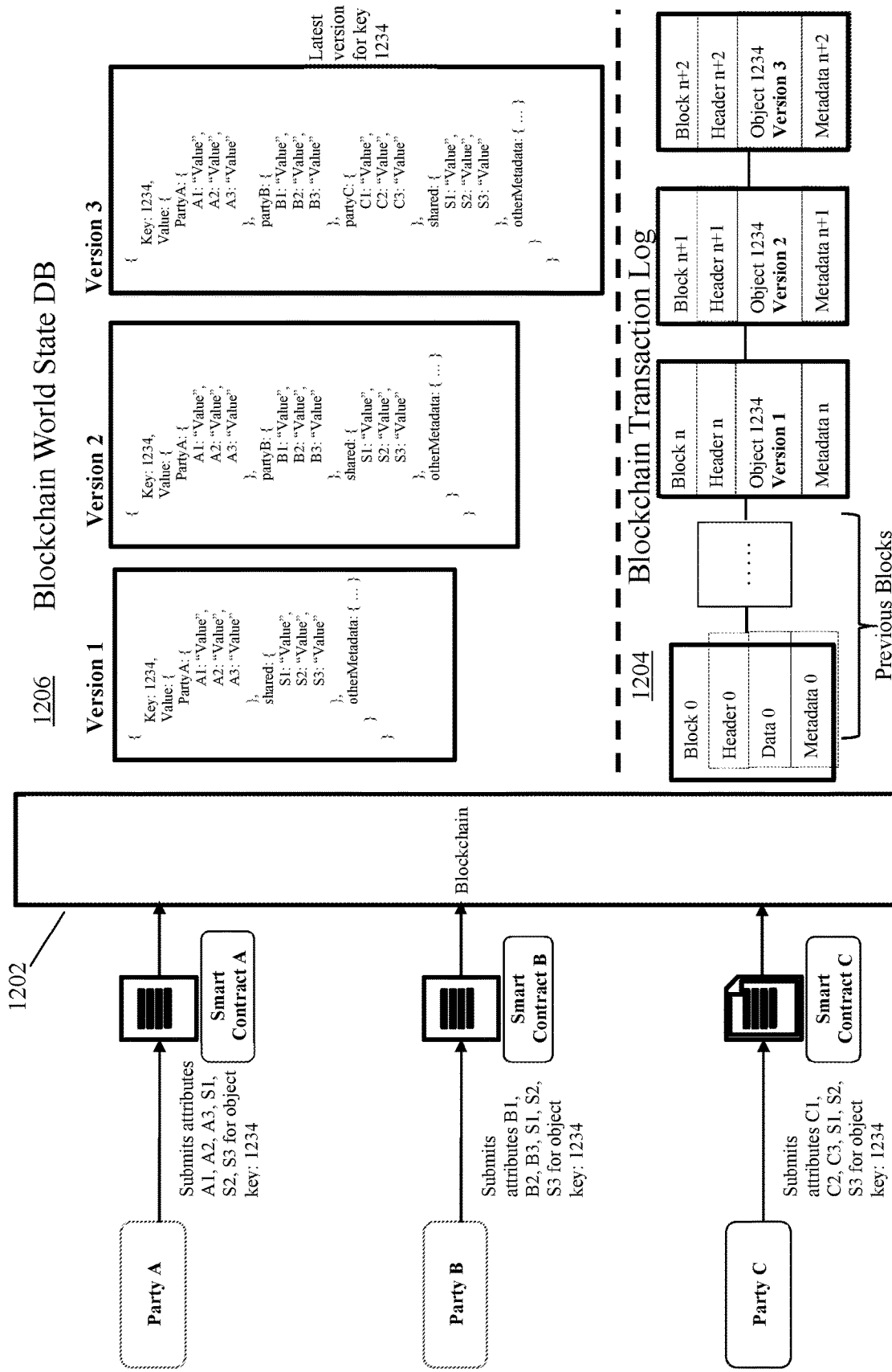
FIG. 12 is a diagram illustrating an operation of modular smart contract with conflict resolution functionality according to an embodiment of the invention.

FIG. 12 illustrates an example of modular, transaction-validation smart contracts used in connection with a distributed ledger 1202 comprising a blockchain transaction log 1204 and a world state database 1206. As shown in FIG. 12, Party A submits its private attributes (A1-A3) and shared attributes (S1-S3) for object key 1234 to smart contract A (e.g., smart contract designed for Party A). Upon receiving transaction information of Party A, smart contract A queries the blockchain-implemented ledger 1202 for a data object with object key 1234. If the object key 1234 does not exist, it will create a Version 1 (V1) of the data object with object key 1234. Smart contract A may then create parent attributes, "Party A" and "Shared" within the data object, embed attributes A1, A2, A3 and their values within the parent attribute "Party A," and embed attributes S1, S2, S3 and their values within the parent attribute "Shared." Subsequently, smart contract A submits a transaction with V1 of the data object corresponding to object key 1234 to the blockchain-implemented ledger 1202. The transaction with V1 of data object corresponding to object key 1234 is recorded in block n of the blockchain transaction log 1204 and corresponds to Version 1 of the blockchain world state database.

Party B submits its private attributes (B1-B3) and shared attributes (S1-S3) for object key 1234 to smart contract B (e.g., smart contract designed for Party B). Upon receiving transaction information of Party B, smart contract B queries the blockchain-implemented ledger 1202 for a data object with object key 1234. Since a data object with object key 1234 already exists in the blockchain 1202, smart contract B creates a Version 2 (V2) of the data object with existing attributes. Smart contract B may then create parent attribute, "Party B," within the data object. Since the parent attribute, "Shared," already exists in blockchain 1202 (corresponding to the Party A transaction), there is no need to create it again. Smart contract B may then embed attributes B1, B2, B3 and their values within the parent attribute. Smart contract B may validate/reconcile values for shared attribute (S1, S2, S3) from Party B against existing values of shared attributes (from Party A). If the data values are validated and no conflicts or discrepancies are discovered, smart contract B submits a transaction with V2 of the data object corresponding to object key 1234 to the blockchain 1202. The transaction with V2 of the data object is recorded in block n+1 of the blockchain transaction log 1204 and corresponds to Version 2 of the blockchain world state database.

Party C submits its private attributes (C1-C3) and shared attributes (S1-S3) for the data object corresponding to object key 1234 to smart contract C (e.g., smart contract designed for Party C). Upon receiving transaction information of Party C, smart contract C queries the blockchain 1202 for a data object with object key 1234. Since a data object with object key 1234 (denoted as Version 2) already exists in the blockchain 1202, smart contract C creates a Version 3 (V3) of the data object with existing attributes. Smart contract C may then create parent attribute, "Party C," within the data object. Since the parent attribute "Shared," already exists in blockchain 1202 (corresponding to the Party A transaction), there is no need to create it again. Smart contract C may then embed attributes C1, C2, C3 and their values within the parent attribute. Smart contract C may validate/reconcile values for shared attribute (S1, S2, S3) from Party C against existing values of shared attributes (e.g., from Party B). If the data values are validated and no conflicts or discrepancies are discovered, smart contract C submits a transaction with V3 of the data object to the blockchain 1202. The transaction with V3 of object 1234 is recorded in block n+2 of the blockchain transaction log 1204 and corresponds to Version 3 of the blockchain world state data base. The foregoing processes can be validated by one or more transaction-validation smart contracts, as described above, applied to different aspects of the transactions.

Figure 13:
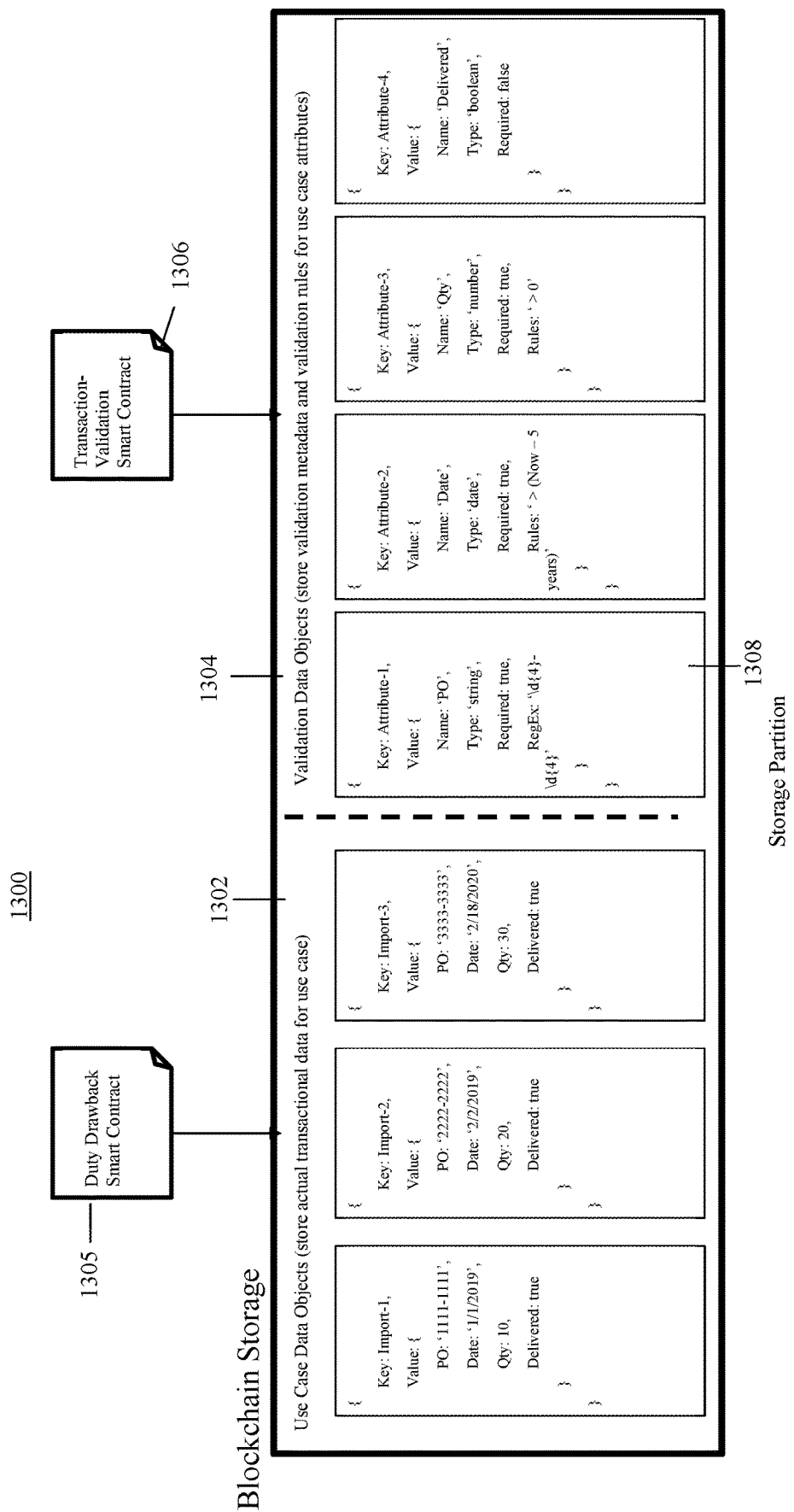
FIG. 13 is a diagram illustrating a transaction-validation smart contract allowing real time or near real time configuration of validation metadata and validation rules according to an embodiment of the invention.

FIG. 13 illustrates a blockchain 1300 with partitioned storage (partition illustrated by dashed line), in accordance with exemplary embodiments of the invention. The blockchain 1300 is partitioned into two segments 1302 and 1304. Partition (segment) 1302 corresponds to a standard blockchain transaction log layout and stores actual data related to a use case in a data object. In the example shown in FIG. 13, a duty drawback smart contract 1305 is utilized with segment 1302 of blockchain 1300 in order to save data related to a data object with four attributes (PO, Date, Qty, and Delivered) to the blockchain. Although a duty drawback smart contract is described as one example, those skilled in the art will appreciate that exemplary embodiments of the invention can be applied to many other use cases.

In one embodiment, segment 1304 of the blockchain 1300 stores, as validation data objects, validation metadata and validation rules on the attributes stored in the blockchain segment 1302. In accordance with some embodiments, a transaction-validation smart contract 1306 is utilized with storage segment 1304 of blockchain 1300. According to one embodiment, the transaction-validation smart contract 1306 may be deployed alongside other smart contracts (such as duty drawback smart contract 1305) to provide configurable validation metadata and validation rules on various transaction attributes. In the example of FIG. 13, the transaction-validation smart contract 1306 saves to the segment 1304 of blockchain 1300 the validation metadata and validation rules for the attributes being used in the duty drawback smart contract 1305.

For example, validation data object 1308 in segment 1304 contains validation metadata for the purchase order ("PO") attribute that requires any value for this attribute to be a string and to follow a certain RegEx pattern. Other attributes may have different validation metadata defined. One benefit of these features is that when a new import transaction is submitted through the duty drawback smart contract 1305, the smart contract 1305 will be able to call upon the transaction-validation smart contract 1306 at runtime (since they are both installed), retrieve any validation metadata and validation rules that are defined, and apply that validation metadata and validation rules to validate the new values that are being submitted. If any of the validation rules need to be updated, the transaction-validation smart contract 1306 will have functionality to add, update, or delete any validation rules or validation metadata. According to one embodiment, a user interface is provided to allow one or more designated users to call the transaction-validation smart contract and apply any updates to the validation metadata and/or validation rules.

According to another aspect of the invention, a user interface and/or portal is provided to update the validation metadata and validation rules associated with the attributes using a transaction-validation smart contract. In the example above, the updated version of the validation rule provided through a user interface or portal states that the import date of new transactions must be within the past 7 years. The next time a transaction is saved, the smart contract will dynamically retrieve all the defined validation metadata and validation rules for the transaction attributes including the updated 7 year rule for the import date attribute, and verify the new values against the validation metadata and validation rules. The user interface provides a user-friendly way to view, add, update, and/or delete the validation metadata and validation rules that have been defined for the transaction attributes According to another embodiment, the automated logic of the smart contract may be configured to deduce missing information and/or validate information based on internal logic and mathematical operations. For example, the relationship between the attributes "Import Amount," "Duty Rate," and "Duty Amount" is Import Amount*Duty Rate=Duty Amount. If a party submits the data without a value for "Import Amount," the value may be deduced from the formula and saved by the smart contract logic. In one embodiment, automated logic of the smart contract may be customized to check for any mathematical discrepancy in the submitted information. For example, a party may submit a data value for the "Import Amount" attribute that does not correspond to a value obtained by dividing the Duty Amount attribute by the Duty Rate attribute. In this case, the information may not be committed to the blockchain until the corresponding parties are notified and the discrepancy is resolved.

According to another embodiment of the invention, the validation metadata and validation rules for information submitted to a blockchain may be based on data type validation, whereby data attributes are checked to determine if they conform to prescribed data type definitions and rules. For example, a smart contract may be configured to accept only dates in the correct format as a valid value for the "Import Date" attribute, and reject a transaction if the value is not a date. As another example, the attribute "PO Number" may need to follow a certain format such as 4 digits, dash, 4 digits (####-####), or certain attributes may not be allowed to contain null/empty values, and additionally may have to be unique. According to one embodiment, regular expressions may be defined to enforce the format and/or length of values for certain attributes.

Although above examples are provided with respect to one or more use cases (e.g., updating the validation metadata and validation rules regarding a duty drawback period), it should be noted that validation metadata and validation rules may be applied to any data elements submitted to a blockchain. Furthermore, validation metadata and validation rules may be specified to express any rule or criteria that may need to be applied to the data elements. The rules or criteria may be based on any relevant guidelines, standards and/or best practices and are not limited to business or tax rules.

It will be appreciated by those persons skilled in the art that the various embodiments described herein are capable of broad utility and application. Accordingly, while the various embodiments are described herein in detail in relation to the exemplary embodiments, it is to be understood that this disclosure is illustrative and exemplary of the various embodiments and is made to provide an enabling disclosure. Accordingly, the disclosure is not intended to be construed to limit the embodiments or otherwise to exclude any other such embodiments, adaptations, variations, modifications and equivalent arrangements.

The system described above can be implemented with servers and other computing devices in various configurations. The various servers and computing devices may use software to execute programs to execute the methods described above. Various embodiments of the invention also relate to the software or computer readable medium containing program instructions for executing the above described methods.

Although the foregoing examples show the various embodiments of the invention in one physical configuration, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. As will be appreciated by those skilled in the art, the components of the various embodiments may be arranged at any location or locations within a distributed network without affecting the operation of the respective system.

Communications networks connect the various computing devices described above and may be comprised of, or may interface to any one or more of, for example, the Internet, an intranet, a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a Digital Subscriber Line (DSL) connection, an Ethernet connection, an Integrated Services Digital Network (ISDN) line, a dial-up port such as a V.90, a V.34 or a V.34bis analog modem connection, a cable modem, an Asynchronous Transfer Mode (ATM) connection, a Fiber Distributed Data Interface (FDDI) connection, a Copper Distributed Data Interface (CDDI) connection, or an optical/DWDM network.

The communications networks that connect the various computing devices described above may also comprise, include or interface to any one or more of a Wireless Application Protocol (WAP) link, a Wi-Fi link, a microwave link, a General Packet Radio Service (GPRS) link, a Global System for Mobile Communication (GSM) link, a Code Division Multiple Access (CDMA) link or a Time Division Multiple Access (TDMA) link such as a cellular phone channel, a GPS link, a cellular digital packet data (CDPD) link, a Research in Motion, Limited (RIM) duplex paging type device, a Bluetooth radio link, or an IEEE 802.11-based radio frequency link. Communications networks may further comprise, include or interface to any one or more of an RS-232 serial connection, an IEEE-1394 (Firewire) connection, a Fibre Channel connection, an infrared (IrDA) port, a Small Computer Systems Interface (SCSI) connection, a Universal Serial Bus (USB) connection or another wired or wireless, digital or analog interface or connection.

In some embodiments, the communication networks may comprise a satellite communications network, such as a direct broadcast communication system (DBS) having the requisite number of dishes, satellites and transmitter/receiver boxes, for example. The communications network may also comprise a telephone communications network, such as the Public Switched Telephone Network (PSTN). In another embodiment, communication networks may comprise a Personal Branch Exchange (PBX), which may further connect to the PSTN.

Although examples of servers and personal computing devices are described above, exemplary embodiments of the invention may utilize other types of communication devices whereby a user may interact with a network that transmits and delivers data and information used by the various systems and methods described herein. The personal computing devices may include desktop computers, laptop computers, tablet computers, smart phones, and other mobile computing devices, for example. The servers and personal computing devices may include a microprocessor, a microcontroller or other device operating under programmed control. These devices may further include an electronic memory such as a random access memory (RAM), electronically programmable read only memory (EPROM), other computer chip-based memory, a hard drive, or other magnetic, electrical, optical or other media, and other associated components connected over an electronic bus, as will be appreciated by persons skilled in the art. The personal computing devices may be equipped with an integral or connectable liquid crystal display (LCD), electroluminescent display, a light emitting diode (LED), organic light emitting diode (OLED) or another display screen, panel or device for viewing and manipulating files, data and other resources, for instance using a graphical user interface (GUI) or a command line interface (CLI). The personal computing devices may also include a network-enabled appliance or another TCP/IP client or other device. The personal computing devices may include various connections such as a cell phone connection, WiFi connection, Bluetooth connection, satellite network connection, and/or near field communication (NFC) connection, for example.

The servers and personal computing devices described above may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software. The modules described above may comprise software, firmware, hardware, or a combination of the foregoing.

It is appreciated that in order to practice the methods of the embodiments as described above, it is not necessary that the processors and/or the memories be physically located in the same geographical place. That is, each of the processors and the memories used in exemplary embodiments of the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

As described above, a set of instructions is used in the processing of various embodiments of the invention. The servers and personal computing devices described above may include software or computer programs stored in the memory (e.g., non-transitory computer readable medium containing program code instructions executed by the processor) for executing the methods described herein. The set of instructions may be in the form of a program or software or app. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Further, it is appreciated that the instructions or set of instructions used in the implementation and operation of the invention may be in a suitable form such that the processor may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processor, i.e., to a particular type of computer, for example. Any suitable programming language may be used in accordance with the various embodiments of the invention. For example, the programming language used may include assembly language, Ada, APL, Basic, C, C++, COBOL, dBase, Forth, Fortran, Java, Modula-2, Pascal, Prolog, REXX, Visual Basic, and/or JavaScript and others. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of various embodiments of the invention may utilize any compression or encryption technique or algorithm, as may be desired. An encryption module might be used to encrypt data. Further, files or other data may be decrypted using a suitable decryption module, for example.

The software, hardware and services described herein may be provided utilizing one or more cloud service models, such as Software-as-a-Service (SaaS), Platform-as-a-Service (PaaS), and Infrastructure-as-a-Service (IaaS), and/or using one or more deployment models such as public cloud, private cloud, hybrid cloud, and/or community cloud models.

In the system and method of exemplary embodiments of the invention, a variety of "user interfaces" may be utilized to allow a user to interface with the personal computing devices. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor. The information provided by the user to the processor through the user interface may be in the form of a command, a selection of data, or some other input, for example.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

What is claimed is:

1. A computer-implemented method for implementing a validation rule for a transaction on a blockchain, the method comprising:
    storing, by a processing device, a first smart contract on a transaction log partition of the blockchain, wherein the first smart contract is configured to execute the transaction;
    storing, by the processing device, a second smart contract on a validation data partition of the blockchain, wherein the second smart contract comprises a transaction validation smart contract configured to validate or invalidate the transaction;
    storing, by the processing device executing the second smart contract, in the validation data partition, a validation data object, wherein the validation data object comprises configurable validation metadata and validation rules for transaction attributes;
    receiving, by the processing device executing the second smart contract, at least one of updated validation metadata or updated validation rules for transaction attributes;
    updating, by the processing device executing the second smart contract, the validation data object in the validation data partition by modifying the at least one of the configurable validation metadata or validation rules for transaction attributes based on the received at least one of the updated validation metadata or the updated validation rules for transaction attributes;
    receiving, by the processing device executing the first smart contract, a transaction data object comprising at least one attribute value related to the transaction;
    validating, by the processing device executing the first smart contract, the transaction data object, wherein validating the transaction data object comprises:
        calling, by the processing device executing the first smart contract, the second smart contract;
        retrieving, by the processing device executing the second smart contract, the validation data object from the validation data partition;
        dynamically applying, by the processing device executing the second smart contract, the configurable validation metadata and the validation rules from the validation data object to the at least one attribute value in the transaction data object;
        determining, by the processing device executing the second smart contract, that the at least one attribute value satisfies the configurable validation metadata and validation rules from the validation data object; and
    storing, by the processing device executing the first smart contract, the transaction data object in the transaction log partition.

2. The method of claim 1, further comprising storing the transaction data object and validation data object in a world state database.

3. The method of claim 1, wherein the at least one attribute value comprises an existing private attribute and attribute value, as well as a shared attribute and attribute value.

4. The method of claim 1, further comprising deploying at least one of the configurable validation metadata and the validation rule to a plurality of nodes on the blockchain.

5. The method of claim 4, further comprising deploying the configurable validation metadata to a plurality of nodes on the blockchain in response to the transaction being submitted to the blockchain by the first smart contract.

6. The method of claim 5, further comprising calling upon the second smart contract by the first smart contract at runtime for validating the transaction.

7. The method of claim 5, further comprising calling upon the second smart contract by the first smart contract at runtime for retroactively validating a previously submitted transaction.

8. The method of claim 1, further comprising recording the validation and the validation rules on a blockchain transaction log.

9. The method of claim 1, wherein the validation rules are based on reconciliation of overlapping attributes.

10. The method of claim 1, further comprising deploying at least one of the validation metadata and the validation rule to a plurality of nodes on the blockchain.

11. The method of claim 1, wherein the one or more validation rules comprise one or more business rules for validating the one or more data object attributes and attribute values stored in the transaction log partition.

\* \* \* \* \*